US010609631B2

(12) United States Patent
Justin et al.

(10) Patent No.: US 10,609,631 B2
(45) Date of Patent: Mar. 31, 2020

(54) ROGUE BASE STATION ROUTER DETECTION WITH CONFIGURABLE THRESHOLD ALGORITHMS

(71) Applicant: LGS Innovations LLC, Herndon, VA (US)

(72) Inventors: Ronald Lance Justin, Denver, CO (US); Jennifer Lynn Ryan, Golden, CO (US); Kerri Ann Stone, Lafayette, CO (US)

( * ) Notice: Subject to any disclaimer, the term of this patent is extended or adjusted under 35 U.S.C. 154(b) by 0 days.

(21) Appl. No.: 16/029,163

(22) Filed: Jul. 6, 2018

(65) Prior Publication Data
US 2019/0132231 A1 May 2, 2019

Related U.S. Application Data

(60) Provisional application No. 62/578,010, filed on Oct. 27, 2017, provisional application No. 62/578,016, (Continued)

(51) Int. Cl.
*H04L 12/26* (2006.01)
*H04W 48/16* (2009.01)
(Continued)

(52) U.S. Cl.
CPC ............ *H04W 48/16* (2013.01); *G06F 3/02* (2013.01); *G06K 9/6219* (2013.01); *G06K 9/6223* (2013.01); *G06N 20/00* (2019.01); *H04L 43/045* (2013.01); *H04L 63/1425* (2013.01); *H04L 63/1483* (2013.01); *H04W 12/12* (2013.01);
(Continued)

(58) Field of Classification Search
CPC . H04L 43/16; H04L 63/1425; H04L 63/1483; H04L 43/045; H04L 41/22; H04W 24/08; H04W 88/08; H04W 48/16; H04W 12/12; H04W 68/005; H04W 84/042; G06F 3/02; G06K 9/6219; G06K 9/6223; G06N 20/00
See application file for complete search history.

(56) References Cited

U.S. PATENT DOCUMENTS 9,049,602 B2 * 6/2015 Walby ................. B60R 25/2072
2012/0027064 A1 * 2/2012 Gupta ................. H04L 27/2647
375/224

(Continued)

*Primary Examiner* — Jung Liu
(74) *Attorney, Agent, or Firm* — Baker & Hostetler LLP

(57) ABSTRACT

One aspect of the patent application is directed to a method for detecting a rogue device in a network. The method includes a step of performing a cellular scan across the network. The method also includes a step of receiving, from the cellular scan, survey data including system information blocks (SIBs) associated with plural devices. The method also includes a step of decoding the SIBS of the devices. The method further includes a step of comparing the decoded SIBs with the predetermined criteria. The method even further includes a step of determining a threshold of the predetermined criteria has been met by the decoded SIBs associated with one of the plural devices. Yet even further, the method includes a step of calculating a confidence level based upon the met threshold of the one device. Lastly, the method includes a step of determining, based on the confidence level, the one device exhibits characteristics of the rogue device.

20 Claims, 16 Drawing Sheets

Related U.S. Application Data filed on Oct. 27, 2017, provisional application No. 62/578,021, filed on Oct. 27, 2017.

(51) Int. Cl.
| | |
|---|---|
| *H04W 12/12* | (2009.01) |
| *H04W 68/00* | (2009.01) |
| *H04W 24/08* | (2009.01) |
| *G06N 20/00* | (2019.01) |
| *G06F 3/02* | (2006.01) |
| *G06K 9/62* | (2006.01) |
| *H04L 29/06* | (2006.01) |
| *H04L 12/24* | (2006.01) |
| *H04W 84/04* | (2009.01) |
| *H04W 88/08* | (2009.01) |

(52) U.S. Cl.
CPC ......... *H04W 24/08* (2013.01); *H04W 68/005* (2013.01); *H04L 41/22* (2013.01); *H04L 43/16* (2013.01); *H04W 84/042* (2013.01); *H04W 88/08* (2013.01)

(56) References Cited

U.S. PATENT DOCUMENTS

| | | | |
|---|---|---|---|
| 2016/0309332 A1* | 10/2016 | Norrman | H04W 12/12 |
| 2017/0150426 A1* | 5/2017 | Goldfarb | H04W 8/02 |
| 2017/0295489 A1* | 10/2017 | Agiwal | H04W 4/70 |
| 2018/0351975 A1* | 12/2018 | Briggs | H04L 63/1425 |
| 2018/0367303 A1* | 12/2018 | Velev | H04L 9/30 |
| 2018/0367998 A1* | 12/2018 | Kunz | H04W 12/12 |

\* cited by examiner

FIG. 5

≡ BITS

| ROGUE BSR | | | | | | NOTIFICATIONS | |
|---|---|---|---|---|---|---|---|
| DETECTION LOGS | | | | | | ⊕ DETECTION_DEVICE_0 DETECTED ROGUE BSR – GSM | 30M |
| ANOMALOUS CELLS | | | | | | ROGUE BSR | SEE ALL ACTIVITY |
| ↔ SETTINGS | CONFIDENCE | GCI | RAT | TRIGGERS | CHANNEL/ CODE | SIGNAL STRENGTH (dBm) | |
| ⚙ DEVELOPER SETTING | ☐ 30% | 3104103813412 | LTE | LTE, ML | 2425 / 264 | -49 | 2 HOURS |
| | ☐ 30% | 31026011102839361 | GSM | PROCEDURAL | 613 / 18 | -86 | 12 MINUTES |
| | ☐ 100% | 31026011102820163 | GSM | PROCEDURAL, STATISTICAL | 612 / 62 | -93 | 20 MINUTES |
| | ☐ 30% | 31026011102835122 | GSM | PROCEDURAL | 614 / 43 | -90 | 12 MINUTES |
| | ☐ 30% | 31026011102839362 | GSM | PROCEDURAL | 685 / 52 | -85 | 12 MINUTES |
| | ☐ 65% | 3104103899513418 | UMTS | PROCEDURAL | 637 / 455 | -103 | 18 MINUTES |
| | ☐ 65% | 3104103899513419 | UMTS | PROCEDURAL | 637 / 224 | -100 | 12 MINUTES |
| | ☐ 65% | 3104103899513411 | UMTS | PROCEDURAL | 4384 / 448 | -83 | 12 MINUTES |
| | ☐ 65% | 3104103899513417 | UMTS | PROCEDURAL | 637 / 448 | -89 | 12 MINUTES |
| | ☐ 65% | 31026011108439362 | UMTS | PROCEDURAL | 2087 / 49 | -86 | 12 MINUTES |
| | ☐ 65% | 31026011108439361 | UMTS | PROCEDURAL | 2087 / 322 | -90 | 12 MINUTES |
| | ☐ 40% | 31026224202012 | LTE | PROCEDURAL, STATISTICAL | 875 / 414 | -60 | 12 MINUTES |
| | ☐ 40% | 31026224202 | LTE | PROCEDURAL, STATISTICAL | 2001 / 268 | -48 | 12 MINUTES |
| | ☐ 65% | 3104103899513199 | UMTS | PROCEDURAL | 637 / 270 | -105 | AN HOUR |
| | ☐ 65% | 3104103899513197 | UMTS | PROCEDURAL | 637 / 299 | -104 | 2 HOURS |
| | ☐ 100% | 31026041335396322 | GSM | PROCEDURAL | 684 / 63 | -50 | AN HOUR |
| | ☐ 65% | 3104103899513413 | UMTS | PROCEDURAL | 4384 / 224 | -89 | 12 MINUTES |
| | ☐ 30% | 31026011102836921 | GSM | PROCEDURAL | 612 / 30 | -97 | 13 MINUTES |
| | ☐ 65% | 31026011108435121 | UMTS | PROCEDURAL | 2087 / 339 | -101 | AN HOUR |
| | ☐ 100% | 31026011102820161 | GSM | PROCEDURAL, STATISTICAL | 683 / 48 | -99 | 31 MINUTES |

| CONFIDENCE | GCI | RAT | TRIGGERS | CHANNEL/CODE | BITS ID | LAST SEEN | FIRST SEEN |
|---|---|---|---|---|---|---|---|
| 100% | 0010213666 | LTE | MASTER, PROCEDURAL | 650 / 14 | 001 | MON AUG 28 2017 13:27:... | THU AUG 24 2017 16:06:4 |
| 100% | 3102605666 | GSM | PROCEDURAL, STATISTICAL | 128 / 0 | 001 | FRI AUG 25 2017 16:51:45... | FRI AUG 25 2017 13:56:35 |
| 100% | 00105100010 | GSM | MASTER, PROCEDURAL | 9 / 2 | 001 | MON AUG 28 2017 15:38:... | FRI AUG 25 2017 14:00:23 |
| 100% | 0010220016969 | GSM | MASTER, PROCEDURAL | 987 / 39 | 001 | FRI AUG 25 2017 16:51:45... | FRI AUG 25 2017 14:11:13 |
| 85% | 3102601102820161 | GSM | PROCEDURAL, STATISTICAL, RXL | 683 / 48 | 001 | TUE OCT 10 2017 09:09:4... | TUE AUG 29 2017 11:55:5 |
| 100% | 310260130 | GSM | PROCEDURAL, STATISTICAL | 512 / 0 | 001 | THU SEP 14 2017 16:58:3... | THU SEP 14 2017 16:34:4 |

*FIG. 6*

≡ BITS

CREATE SURVEY

DASHBOARD (THU, 29 MAR 2018 23:42:53 GMT)     STOP     REMOVE

✯ DASHBOARD
⚙ CONFIGURATION
≡ SURVEY

CURRENT STATUS (RUNNING)

SURVEY

| | |
|---|---|
| RUN TIME | 4M 11S |
| START TIME | 5:42:53 PM |
| END TIME | -- |
| LAST MEASUREMENT | A FEW SECONDS AGO |
| LAST ITERATION TIME | 2M 53S |
| ITERATION COUNT | 1 |

DECODE PROGRESS 68.90%

CELL COUNTS

| RAT | CELLS | MEASUREMENT |
|---|---|---|
| LTE ◊ | 8 | 29 |
| UMTS ◊ | 6 | 16 |
| GSM ◊ | 5 | 13 |
| TOTAL | 19 | 58 |

FIG. 7

| CELL INFORMATION | |
|---|---|
| RAT | UMTS |
| BAND | BAND 2 – 1900 – PCS A-F |
| NETWORK | AT&T; WIRELESS INC. (UNITED STATES) |
| PLMN | 310410 |
| LAC | 38996 |
| CELL ID | 13487 |
| CGI | 3104103899613487 |
| UARFCN | 412 |
| PSC | 508 |
| EC/NO | -17 |
| RSCP | -108 |
| FREQ. MHz | 1932.50 |
| FULL DECODE | YES |
| NEIGHBORS COMPLETE | YES |

BA-LIST (0)

INTRA FREQUENCY CELLS (1)

INTER RAT CELLS (0)

SIBs (7)
EXPAND ALL    COLLAPSE ALL

| SIB 1 | NAS INFORMATION |
|---|---|
| SIB 2 | AVAILABLE URAs |
| SIB 3 | CELL SELECTION/RESELECTION PARAMETERS USED BY UE IN IDLE MODE |
| SIB 5 | COMMON PHYSICAL CHANNELS INFORMATION FOR UE IN IDLE MODE |
| SIB 7 | FAST CHANGING CELL PARAMETER INFORMATION |
| SIB 11 | MEASUREMENT CONTROL INFORMATION UE IN IDLE MODE |
| MIB | MASTER INFORMATION BLOCK |

*FIG. 8*

BITS

- ROGUE BSR
- ANOMALOUS CELLS
- SETTINGS
- DEVELOPER SETTINGS

← 310260413535539632

PROCEDURAL

PARAMETER A, TRIGGER

PARAMETER B, TRIGGER

PARAMETER C, TRIGGER

PARAMETER D, TRIGGER

NOTES

SIGNAL STRENGTH

CITRADAMUS
THU MAR 29 2018 16:40:26 GMT-0600 (MDT)

*FIG. 10*

ROGUE BASE STATION ROUTER DETECTION WITH CONFIGURABLE THRESHOLD ALGORITHMS

CROSS-REFERENCE TO RELATED APPLICATIONS

This application claims the benefit of priority of U.S. Provisional Application No. 62/578,010 filed Oct. 27, 2017, entitled "Rogue Base Station Router Detection and Identification with Machine Learning Algorithms," U.S. Provisional Application No. 62/578,016 filed Oct. 27, 2017, entitled "Rogue Base Station Router Detection and Identification with Statistical Algorithms," and U.S. Provisional Application No. 62/578,021 filed Oct. 27, 2017, entitled "Rogue Base Station Router Detection and Identification with Procedural Algorithms," the contents of which are incorporated by reference in their entirety herein.

FIELD

This application is generally related to methods and architectures for detecting and identifying a cellular rogue base station router (RBSR) via configurable threshold algorithms.

BACKGROUND

By 2020, tens of billions of connected Internet of Things (IoT) devices with wireless interfaces will be in the marketplace and connect the modern world. Almost half of those IoT devices will have cellular radios. As a result, the likelihood of experiencing a cyber-attack by an RBSR continues to increase. Generally, RBSRs are classified as cellular routers that transmit outside the authority of the governing regulatory agency.

At a rudimentary level, low-cost commercial hardware and open source software can be employed by third parties to inflict significant attacks on enterprise Wi-Fi and cellular networks. Indeed, with a low-cost commercial off-the-shelf (COTS) software-defined radio (SDR) kit and open-source cellular base station software, a malicious actor can deny cellular service to smart devices and machine-to-machine (M2M) networks. Further, a malicious actor can remotely track persons via their phones, snoop on communications, and inject malicious software into devices. The consequences can range from unfavorable user experiences and social disturbances to more significant concerns including financial loss and negative media exposure.

There is a need in the art for techniques and architectures for detecting an RBSR, such as for example, an illegal/rogue commercial cellular tower in a network over multiple cellular protocols.

There is a need in the art for techniques and architectures for identifying the technologies in use (e.g., Open BTS, OpenAirInterfaceLTE, etc.) by a detected RBSR.

There is a need in the art for techniques and architectures for detecting a precursor event to cellular attacks over multiple cellular protocols.

There is a further need in the art for techniques and architectures for testing a base station router (BSR) in a cellular network.

SUMMARY

The foregoing needs are met, to a great extent, by the application, systems and techniques for detecting RBSRs across multiple cellular protocols. The foregoing needs are also met, to a great extent, by the application, which further describes systems and techniques for identifying the technologies in use by RBSRs across multiple cellular protocols One aspect of the patent application is directed to a method for detecting an RBSR in a network. The method includes a step of providing an algorithm that includes predetermined criteria, which is to be executed by a processor, for discovering the rogue device. The method also includes a step of performing a cellular scan across the network. The method also includes a step of receiving, from the cellular scan, survey data including system information blocks (SIBs) associated with plural devices. The method also includes a step of decoding the SIBs of the devices. The method further includes a step of comparing the decoded SIBs with the predetermined criteria. The method even further includes a step of determining a threshold of the predetermined criteria has been met by the decoded SIBs associated with one of the plural devices. Yet in further, the method includes a step of calculating a confidence level based upon the met threshold of the one device. The method also includes a step of determining, based on the confidence level, the one device exhibits characteristics of the rogue device.

Another aspect of the patent application is directed to a system including a non-transitory computer readable media storing instructions for configuring a BSR in a cellular communication network, and a processor for executing the instructions. The executable instructions include configuring an algorithm including predetermined criteria representative of rogue device. The executable instructions also include evaluating information transmitted by the BSR in view of the predetermined criteria. The executable instructions further include determining the BSR has met a threshold for the predetermined criteria. The executable instruction even further include notifying an administrator that the information transmitted by the BSR needs to be updated in view of the determination.

Yet another aspect of the patent application is directed to a system for testing a cellular network. The system includes a non-transitory computer readable media storing instructions for determining if a cellular attack on a communication system is active, and a processor for executing the instructions. The executable instructions includes identifying a BSR in the communication system via a cellular scan. The executable instructions also includes determining the BSR in the communication system is an RBSR based upon a threshold of a predetermined criteria being met. The executable instructions also includes determining an event directed to cellular connectivity (i.e., network connectivity issues) is present in the communication system. The executable instructions further includes computing a confidence level of the active cellular attack based on the determined RBSR and the determined event. The executable instructions even further includes sending a notification to users in the communication system of the active cellular attack.

There has thus been outlined, rather broadly, certain embodiments of the application in order that the detailed description thereof herein may be better understood, and in order that the present contribution to the art may be better appreciated. There are, of course, additional embodiments of the application that will be described below and which will form the subject matter of the claims appended hereto.

BRIEF DESCRIPTION OF THE DRAWINGS

In order to facilitate a fuller understanding of the application, reference is made to the accompanying drawings, in which like elements are referenced with like numerals. These drawings should not be construed to limit the application and are intended only for illustrative purposes.

FIG. 5 illustrates a graphical user interface (GUI) of detected cellular towers in a network on a display according to an aspect of the application.

FIG. 6 illustrates a GUI of detected BSRs in a network on a display according to an aspect of the application.

FIG. 7 illustrates a GUI of a survey of towers in the network on a display according to an aspect of the application.

FIG. 8 illustrates a GUI of decoded cellular broadcast information on a display according to an aspect of the application.

FIG. 10 illustrates a GUI of a detection state of the network on a display according to an aspect of the application

DETAILED DESCRIPTION

Figure 1A:
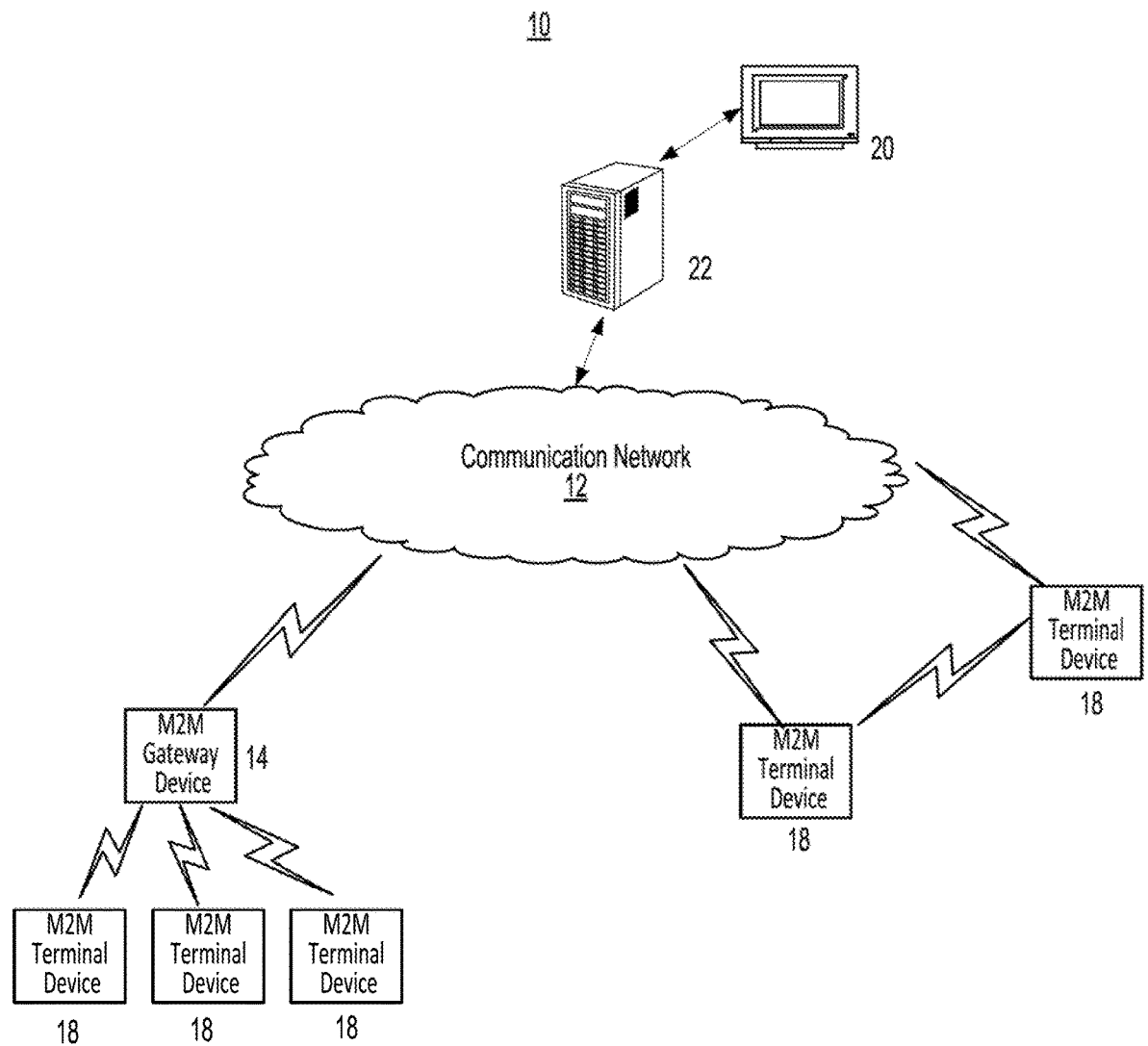
FIG. 1A illustrates a system diagram of an exemplary M2M, IoT, or Web of Things (WoT) communication system in which one or more disclosed embodiments may be implemented.

The application is not limited in its application to the details of construction and to the arrangements of the components set forth in the following description or illustrated in the drawings. The application is capable of embodiments in addition to those described and of being practiced and carried out in various ways. Also, the phraseology and terminology employed herein, as well as in the Abstract, are for the purpose of description and should not be regarded as limiting.

For purposes of this patent application, an RBSR can be interchangeably referred to as a rogue cellular tower. Likewise, a BSR can be interchangeably referred to as a cellular tower.

In a first aspect of the patent application, an architecture is provided including a non-transitory computer readable media, such as a software application, storing instructions that when executed by a processor perform steps to detect an RBSR in a network. The instructions and progress of the steps can be viewed and manipulated via a GUI appearing on a display operably coupled to the processor. In one embodiment, the executed instructions detect malicious or outlier cellular base stations based on decoded system information wirelessly broadcast therefrom. The procedural/configurable detection algorithm currently operates over 2G (namely Global System for Mobile Communications (GSM)), 3G and 4G radio access technologies (RATs) (namely Universal Mobile Telecommunications System (UMTS) and Long-Term Evolution (LTE)). The same methodology can be used to detect rogue GSM, UMTS and LTE cellular emitters.

In one embodiment of this aspect, the executed instructions include the steps of running a cellular scan across a region or network. The cellular scan uncovers various survey-data for devices in the network including system information blocks (SIBs). The processor executing the instructions decodes the uncovered SiBs for various devices. These SIBs are compared with predetermined criteria of the software application used to evaluate whether an RBSR is present. A determination is made whether the detected SIBs exceed a threshold set for one or more predetermined criteria. If the threshold for one or more of the predetermined criteria is exceeded, a weighted sum for one or more predetermined criteria is added to an algorithm to determine a confidence level thai a device exhibits characteristics of an RBSR.

In a second aspect of the patent application, an architecture is described including a non-transitory computer readable media storing instructions that when executed by a processor perform the steps of detecting that a cellular attack is imminent or presently occurring. The instructions and progress of the detection steps can be viewed and manipulated via a GUI appearing on a display operably coupled to the processor.

In a third aspect of the patent application, an architecture is described including a non-transitory computer readable media storing instructions that when executed by a processor performs the steps of testing and determining that a BSR is operating within predetermined ranges in a cellular communication system (e.g., not as an RBSR). The software instructions and progress of the detection steps can be viewed and manipulated via a GUI appearing on a display operably coupled to the processor.

The inventive concepts of this application, at least directed to detecting and identifying RBSRs as well as those directed to preventing or minimizing exposure to cyber-attacks within a cellular network are not considered routine, conventional or well-understood in the field. Namely, the skilled person would readily consider the invention, and the accompanying claims, to be directed to patent eligible subject matter under the Alice two-step framework. Namely, the inventive concepts are not abstract since they improve the technical field of cyber security by efficiently determining which devices are RBSRs and subsequently identifying the technologies (e.g., Open BTS, OpenAirInterfaceLTE) in use by the detected RBSRs. Further, the disclosed systems and techniques can be configured to provide alerts to interested parties or stakeholders, enabling them to act appropriately to prevent or reduce exposure of an imminent or current cyber-attack. The disclosed systems and techniques provide a certain degree of confidence upon analyzing hundreds, perhaps thousands of devices in a network in a short time period. Moreover, the detection occurs in real-time and may be performed in continuous/repeated mode. In the field of cyber security, every minute of a suspected or current cyber-attack is critical. As a result, notifications rapidly are sent to users in the network once a device exceeds a predetermined confidence level and is designated as an RBSR. The accuracy and speed at which the analysis and further notification to users in the network simply could not have been done by a human or by conventional software.

System Information

Cellular BSRs broadcast information over wireless media to enable user equipment (UE) to communicate with and connect to the BSR. As an example, broadcast information transmitted by LTE cellular BSRs is herein described, although the same or similar information or types of information may be applicable with respect to other wireless mediums or protocols. The SI of LTE cellular BSRs is transmitted over the BCH. UE devices receive BCH signaling information on the downlink channel. The three types of BCHs include the broadcast control channel (BCCH), synchronization channel (SCH), and the frequency correction channel (FCCH).

The SI includes a static part and a dynamic part. The static part, referred to as the master information block (MIB), is transmitted using the BCH, and is carried by a physical broadcast channel (PBCH) every 40 ms. The MIB contains information such as channel bandwidth, physical channel hybrid-ARQ indicator channel (PHICH) configuration information, transmit power, number of antennas, and SIB scheduling information transmitted along with other information on the downlink-scheduled channel (DL-SCH).

The dynamic part of SI includes the SIB. The SIB is mapped to radio resource control (RRC) messages (SI-1,2,3,4,5,6,7,8,9,10,11) over the DL-SCH and is transmitted using the physical downlink shared channel (PDSCH) at periodic intervals. For example, SI-1 is transmitted every 80 ms, SI-2 is transmitted every 160 ms, and SI-3 is transmitted every 320 ms.

SIBs are grouped in SI containers. Each SI is composed of multiple SIBs. Each SI will usually have a different transmission frequency and will be sent in a single subframe. SIBs are transmitted using BCCH mapped on DL-SCH, which is in turn mapped on PDSCH. Table 1 below describes the MIB and SIBs in LTE.

TABLE 1

| LTE MIB and SIBs | Description |
| --- | --- |
| MIB | Carries physical layer information of LTE cell, which in turn help receive further SIs, i.e., system bandwidth. |
| SIB1 | Contains information regarding whether or not UE is allowed to access the LTE cell. SIB1 also defines the scheduling of the other SIBs. SIB1 carries a cell ID, mobile country code (MCC), mobile network code (MNC), tracking area code (TAC), and SIB mapping. |
| SIB2 | Carries common channel as well as shared channel information. SIB2 also carries radio resource control (RRC), uplink power control, preamble power ramping, uplink Cyclic Prefix Length, sub-frame hopping, and uplink E-UTRA absolute radio frequency channel number (EARFCN). |
| SIB3 | Carries cell re-selection information as well as Intra frequency cell re-selection information. |
| SIB4 | Carries Intra Frequency Neighbors (on same frequency). Carries serving cell and neighbor cell frequencies required for cell reselection as well as handover between same RAT base stations and different RAT base stations. |
| SIB5 | Carries Inter Frequency Neighbors (on different frequency). Carries E-UTRA LTE frequencies and other neighbor cell frequencies from other RATs. The purpose is cell reselection and handover. |
| SIB6 | Carries wideband code division multiple access (WCDMA) neighbors information, i.e., serving universal terrestrial radio access (UTRA) and neighbor cell frequencies useful for cell re-selection |

TABLE 1-continued

| LTE MIB and SIBs | Description |
| --- | --- |
| SIB7 | Carries neighbors' information. Used for cell re-selection as well as for handover purposes. |
| SIB8 | Carries code-division multiple access (CDMA)-2000 EVDO frequencies and CDMA-2000 neighbor cell frequencies. |
| SIB9 | Carries Home eNodeB Identifier (HNBID) |
| SIB10 | Carries east west technical services (ETWS) primary notification |
| SIB11 | Carries ETWS secondary notification |

General Architecture

FIG. 1A is a diagram of an example M2M, IoT, or WoT communication system 10 in which one or more disclosed embodiments may be implemented. Generally, M2M technologies provide building blocks for IoT or WoT systems, and any M2M device, M2M gateway, M2M server, or M2M service platform may be a component or node of an IoT or WoT system as well as an IoT or WoT Service Layer, etc.

As shown in FIG. 1A, the M2M, IoT, or WoT communication system 10 includes a communication network 12. The communication network 12 may be a fixed network (e.g., Ethernet, Fiber, Integrated Services Digital Network (ISDN), Power Line Communication (PLC), or the like), a wireless network (e.g., Wireless Local Area Network (WLAN), cellular, or the like), or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as CDMA, time division multiple access (TDMA), frequency division multiple access (FDMA), orthogonal FDMA (OFDMA), single-carrier FDMA (SC-FDMA), and the like. Further, the communication network 12 may comprise other networks, such as a core network, the Internet, a sensor network, an industrial control network, a personal area network, a fused personal network, a satellite network, a home network, or an enterprise network.

As shown in FIG. 1A, the M2M, IoT, or WoT communication system 10 may include M2M gateway devices 14 and M2M terminal devices 18. It will be appreciated that any number of M2M Gateway Devices 14 and M2M terminal devices 18 may be included in the M2M, IoT, WoT communication system 10 as desired. Each of the M2M gateway devices 14 and M2M Terminal devices 18 are configured to transmit and receive signals, such as via communications circuitry, the communication network 12, or direct radio link. An M2M gateway device 14 allows wireless M2M devices (e.g., cellular and non-celluiar) as well as fixed network M2M devices (e.g., PLC) to communicate either through operator networks, such as the communication network 12, or the direct radio link. For example, the M2M terminal devices 18 may collect data and send the data, via the communication network 12 or direct radio link, to an M2M application 20 or other M2M terminal device 18. The M2M terminal devices 18 may also receive data from the M2M application 20 or another M2M terminal device 18. Further, data and signals may be sent to and received from the M2M application 20 via an M2M Service Layer 22, as described below. M2M terminal devices 18 and M2M gateway devices 14 may communicate via various networks including, for example, cellular, WLAN, Wireless Personal Area Network (WPAN) (e.g., Zigbee, 6LoWPAN, Bluetooth), direct radio link, and wireline. Exemplary M2M terminal devices 18 that could be impacted by the presence of an RBSR include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 1B:
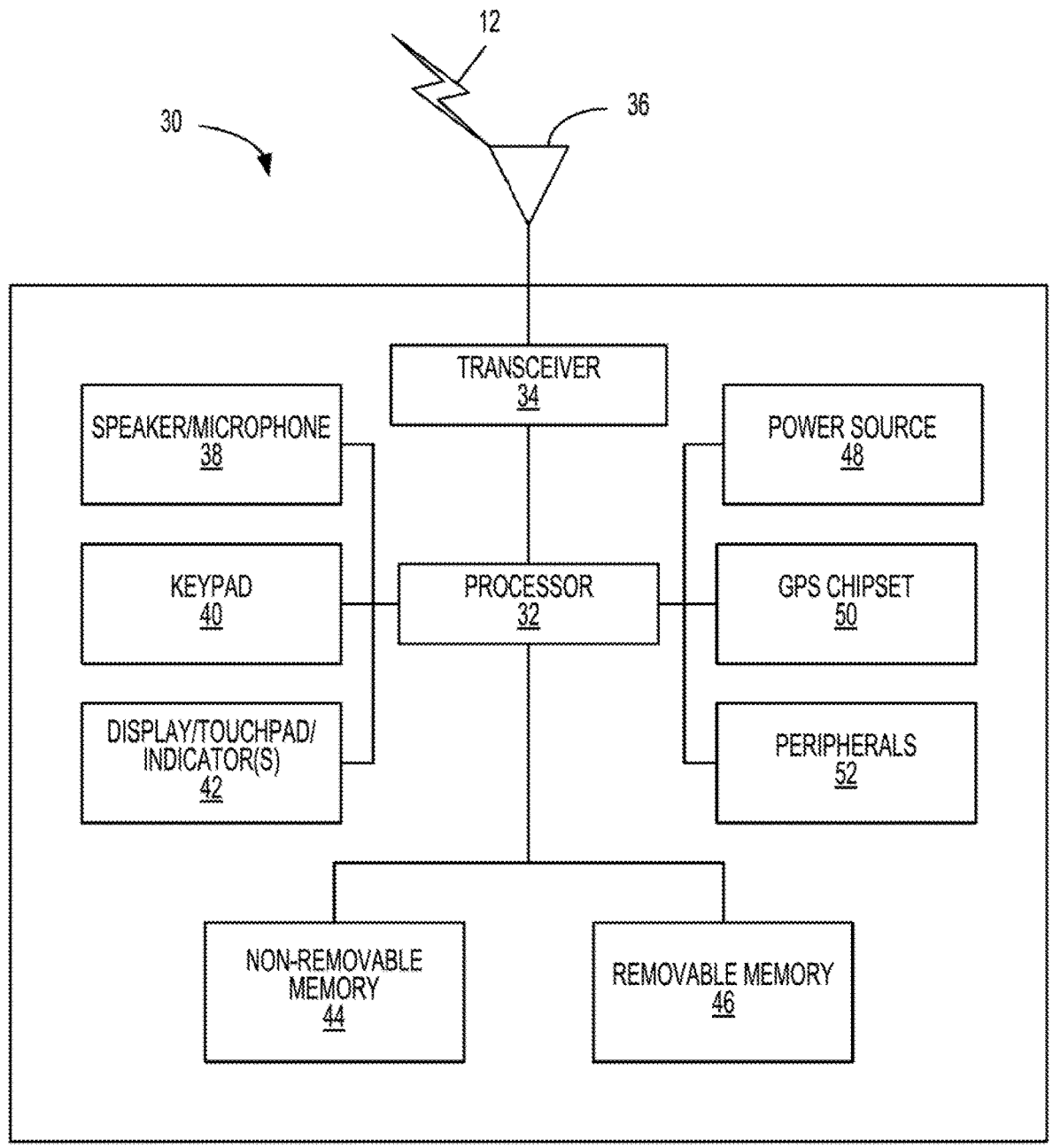
FIG. 1B illustrates a system diagram of an exemplary communication network node.

FIG. 1B is a block diagram of an exemplary hardware/software architecture of a node 30 of a network, such as clients, servers, or proxies, which may operate as an M2M server, gateway, device, or other node in an M2M network. The node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. The node 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node 30. For example, the processor 32 may perform signal coding, data processing, power control, input/output processing, and/or any other functionality that enables the node 30 to operate in a wireless or wired environment. The processor 32 may run application-layer programs (e.g., browsers) and/or radio-access-layer (RAN) programs and/or other communications programs. The processor 32 may also perform security operations such as authentication, security key agreement, and/or cryptographic operations. The security operations may be performed, for example, at the access layer and/or application layer.

As shown in FIG. 1B, the processor 32 is coupled to its communication circuitry (e.g., transceiver 34 and transmit/receive element 36). The processor 32, through the execution of computer-executable instructions, may control the communication circuitry to cause the node 30 to communicate with other nodes via the network to which it is connected. While FIG. 1B depicts the processor 32 and the transceiver 34 as separate components, the processor 32 and the transceiver 34 may be integrated together in an electronic package or chip.

The transmit/receive element 36 may be configured to transmit signals to, or receive signals from, other nodes, including M2M servers, gateways, wireless devices, and the like. For example, in an embodiment, the transmit/receive element 36 may be an antenna configured to transmit and/or receive radio frequency (RF) signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. The transmit/receive element 36 may be configured to transmit and/or receive any combination of wireless or wired signals.

In addition, although the transmit/receive element 36 is depicted in FIG. 1B as a single element, the node 30 may include any number of transmit/receive elements 36. More specifically, the node 30 may employ multiple-in and multiple-out (MIMO) technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. The node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, and a vehicle, such as a car, truck, train, or airplane. The node 30 may connect to other components, modules, or systems of such apparatuses or devices via one or more interconnect interfaces, such as an interconnect interface that may comprise one of the peripherals 52.

Figure 1C:
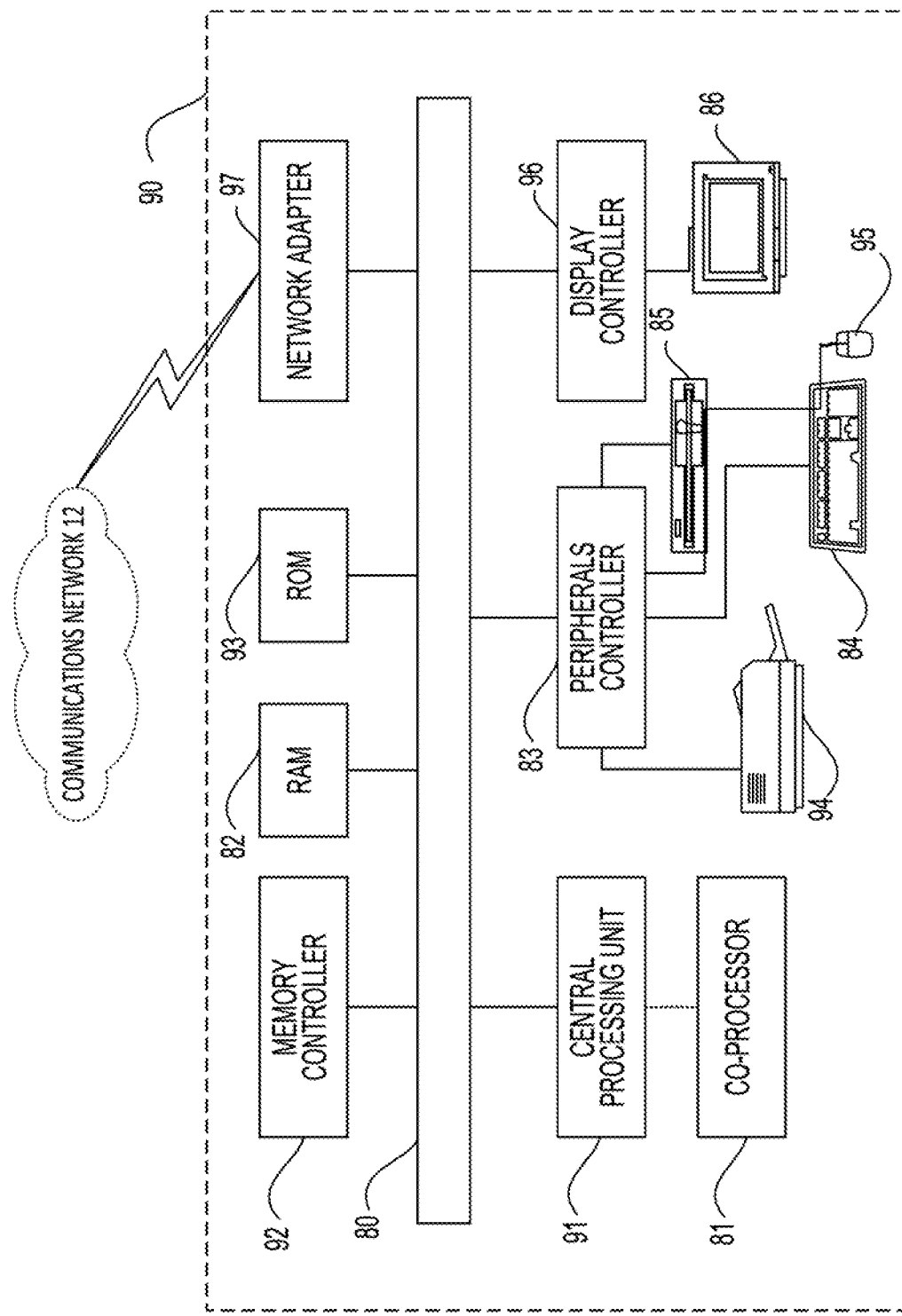
FIG. 1C illustrates a block diagram of an exemplary computing system.

FIG. 1C is a block diagram of an exemplary computing system 90 that may also be used to implement one or more nodes (e.g., clients, servers, or proxies) of a network, which may operate as an M2M server, gateway, device, or other node in an M2M network.

The computing system 90 may comprise a computer or server and may be controlled primarily by computer-readable instructions, which may be in the form of software, by whatever means such software is stored or accessed. Such computer-readable instructions may be executed within a processor, such as a central processing unit (CPU) 91, to cause the computing system 90 to effectuate various operations. In many known workstations, servers, and personal computers, the CPU 91 is implemented by a single-chip CPU called a microprocessor. In other machines, the CPU 91 may comprise multiple processors. A co-processor 81 is an optional processor, distinct from the CPU 91 that performs additional functions or assists the CPU 91. In operation, the CPU 91 fetches, decodes, executes instructions, and transfers information to and from other resources via the computer's main data-transfer path, a system bus 80. Such a system bus 80 connects the components in the computing system 90 and defines the medium for data exchange. The system bus 80 typically includes data lines for sending data, address lines for sending addresses, and control lines for sending interrupts and for operating the system bus 80. An example of such a system bus 80 is the PCI (Peripheral Component Interconnect) bus.

In operation, the CPU 91 fetches, decodes, executes instructions, and transfers information to and from other resources via the computer's main data-transfer path, a system bus 80. Such a system bus 80 connects the components in the computing system 90 and defines the medium for data exchange. The system bus 80 typically includes data lines for sending data, address lines for sending addresses, and control lines for sending interrupts and for operating the system bus 80. An example of such a system bus 80 is the PCI (Peripheral Component Interconnect) bus.

Memories coupled to the system bus 80 include RAM 82 and (ROM 93. Such memories include circuitry that allows information to be stored and retrieved. The ROM 93 generally contains stored data that cannot easily be modified. Data stored in the RAM 82 may be read or changed by the CPU 91 or other hardware devices. Access to the RAM 82 and or the ROM 93 may be controlled by a memory controller 92. The memory controller 92 may provide an address translation function that translates virtual addresses into physical addresses as instructions are executed. The memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, the computing system 90 may contain a peripherals controller 83 responsible for communicating instructions from the CPU 91 to peripherals, such as a primer 94, a keyboard 84, a mouse 95, and a disk drive 85.

A display 86, which is controlled by a display controller 96, is used to display visual output generated by the computing system 90. Such visual output may include text, graphics, animated graphics, and video. The display 86 may be implemented with a CRT-based video display, an LCD-based flat-panel display, gas plasma-based flat-panel display, or a touch-panel. The display controller 96 includes electronic components required to generate a video signal that is sent to the display 86.

Further, the computing system 90 may contain communication circuitry, such as a network adaptor 97, that may be used to connect the computing system 90 to an external communications network, such as the communication network 12 of FIG. 1A, to enable the computing system 90 to communicate with other nodes of the network.

RBSR Detection in a Cellular Network

Figure 2A:
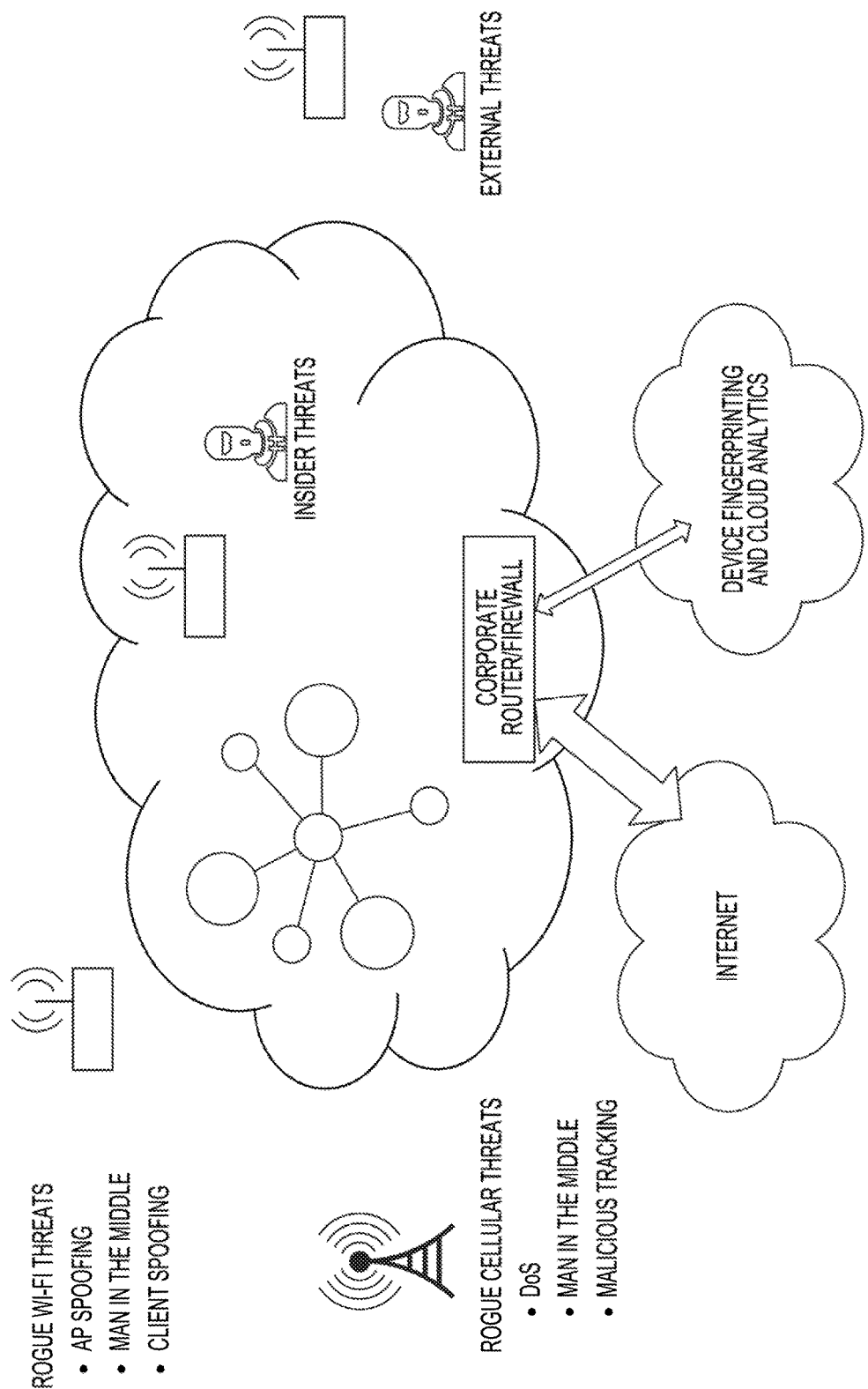
FIG. 2A illustrates a wireless threat landscape.

A wireless threat landscape is depicted in FIG. 2A. Specifically, the threats may come from either inside or outside of the network. Outside threats may include rogue Wi-Fi threats and rogue cellular threats.

The rogue cellular threats may occur via a man-in-the-middle (MITM) attack whereby the attacker secretly relays and possibly alters the communication between two parties who believe they are directly communicating with each other. One example is active eavesdropping, in which the attacker makes independent connections with the victims and relays messages between them to make them believe they are talking directly to each other over a private connection. Unfortunately, the conversation is controlled by the attacker. The attacker must be able to intercept all relevant messages passing between the two victims and inject new ones.

Rogue cellular threats may also include denial-of-service (DoS) wherein the perpetrator seeks to make a machine or network resource unavailable to its intended users by temporarily or indefinitely disrupting services of a host connected to the network. Denial of service is typically accomplished by flooding the targeted machine or resource with superfluous requests in an attempt to overload systems and prevent some or all legitimate requests from being fulfilled. In a distributed denial-of-service attack (DDoS attack), the incoming traffic flooding the victim originates from many different sources. This effectively makes it impossible to stop the attack simply by blocking a single source. A DoS or DDoS attack is analogous to a group of people crowding the entry door of a shop, making it hard for legitimate customers to enter, and thus disrupting trade.

Figure 2B:
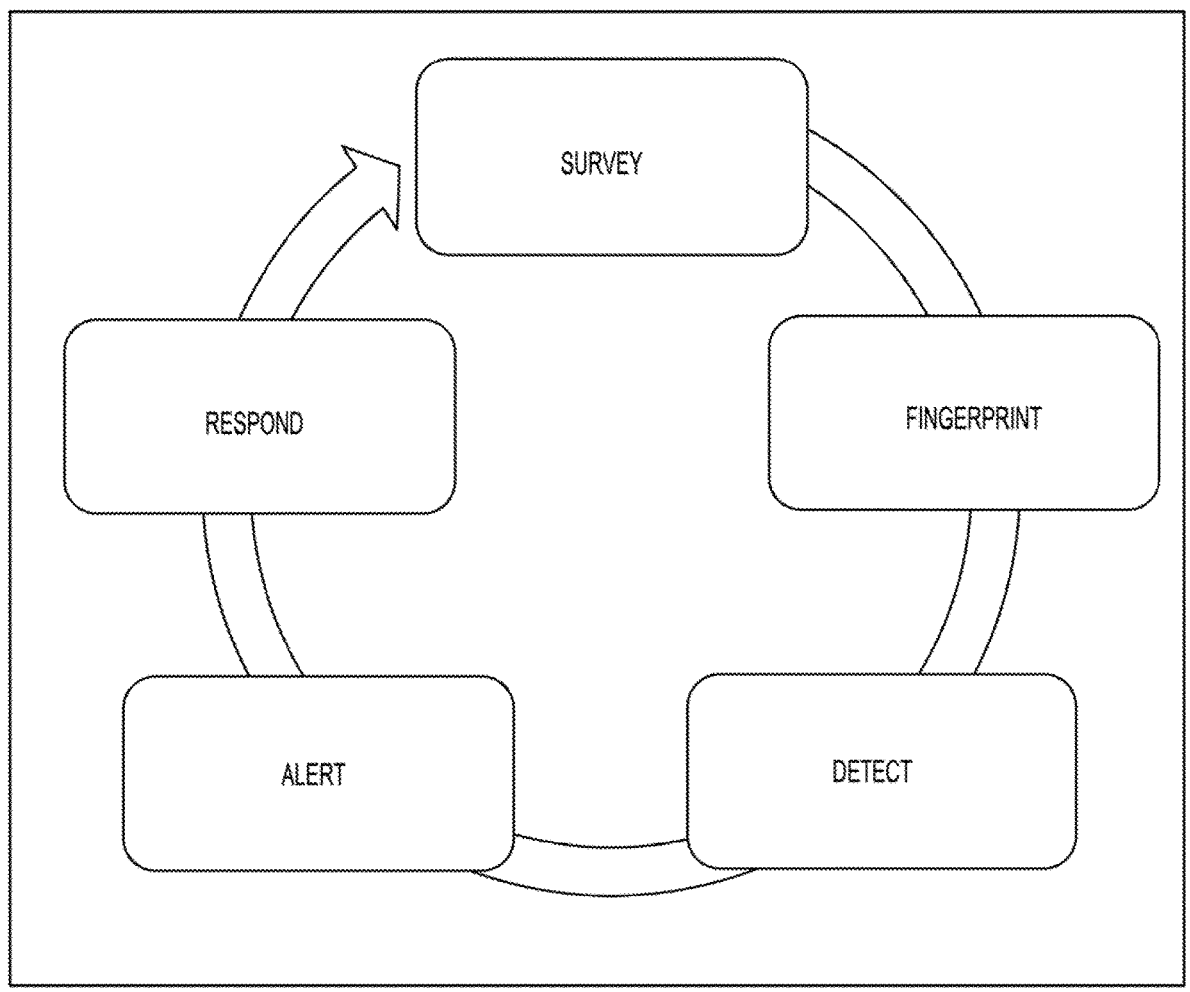
FIG. 2B illustrates a threat monitoring cycle for an RBSR detection and identification application.

According to one aspect of the patent application, FIG. 2B illustrates a general flow for an RBSR detection and identification software application. Moving clockwise beginning at noon in FIG. 2B, the software application persistently surveys and analyzes/fingerprints survey data in the network. The RF data is decoded into BSR layer three broadcast messages. Select layer three broadcast message parameters are used by the procedural RBSR detection and identification algorithm to flag anomalous cells. The procedural RBSR detection algorithm separates the survey data based upon network carrier (e.g., AT&T, T-Mobile, etc.) and technology set (i.e., GSM, UMTS, LTE, CDMA, EVDO). The procedural analysis of the survey data is then calculated for each public land mobile network (PLMN) in each RAT. Upon rogue detection, the application alerts users with a variety of configurable notification options, such as push alerts to a browser, texts, or emails.

Next in FIG. 2B, based upon one or more algorithms, the software application detects malicious or outlier cellular base stations based on layer three wireless broadcast information transmitted by cellular BSRs. An example of layer three broadcast information includes such cell parameters as neighbor list contents and cell reselect offset r (CRO). After detecting an RBSR, the software application alerts responsible parties of an attack. This helps users on the network become more vigilant with regard to future transmissions and receptions. Further, the software application responds to the attack by either denying service to the RBSR or letting an appropriate agency know of its illegal activities.

Figure 3:
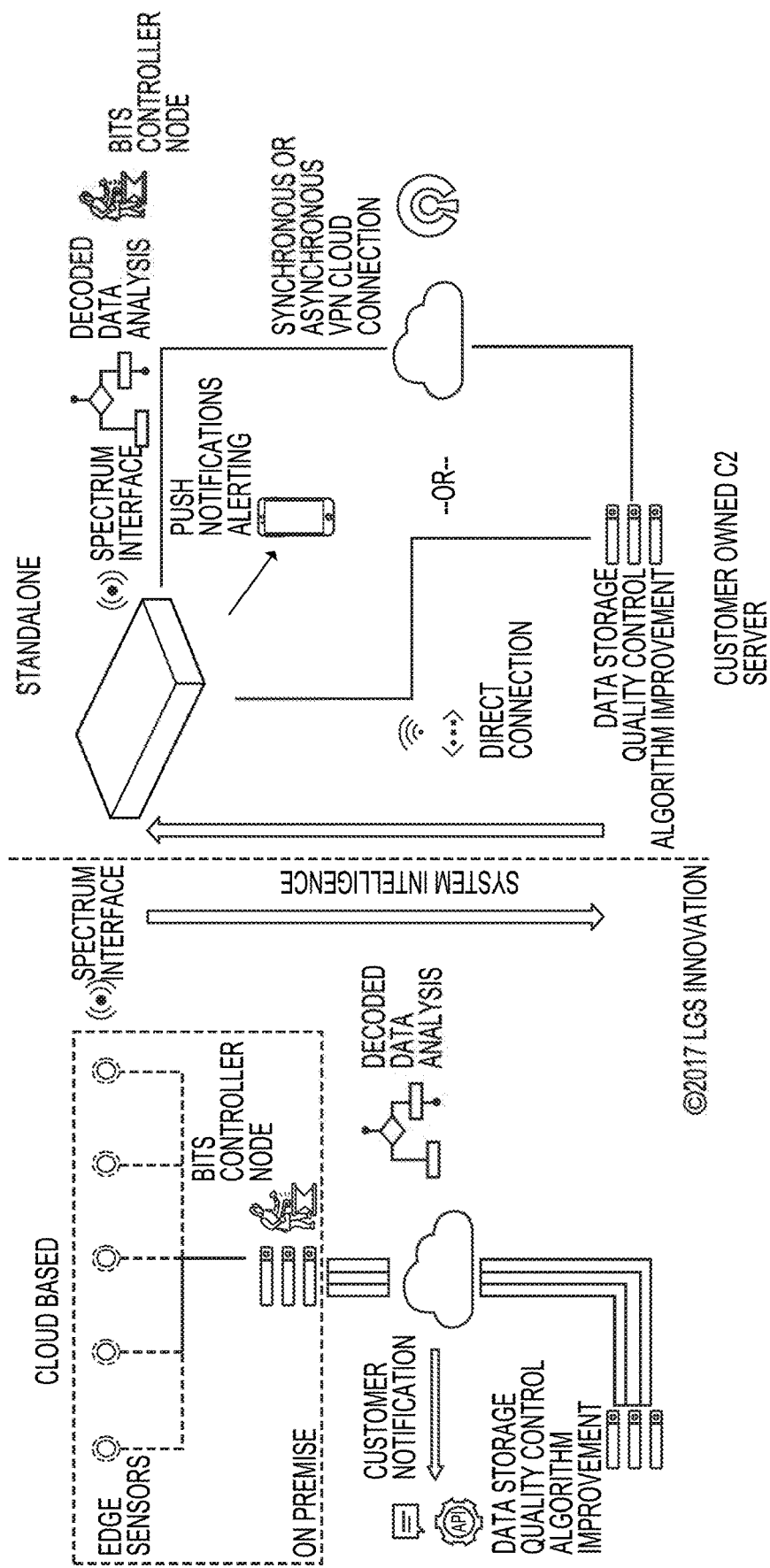
FIG. 3 illustrates cloud-based and standalone architectures for an RBSR detection and identification application.

According to another aspect of the patent application, FIG. 3 illustrates an RBSR detection and identification system. As shown, the left side of FIG. 3 describes a cloud-based infrastructure, and the right side describes a standalone infrastructure. In the standalone architecture, the RBSR detection and identification system includes all the hardware and software required to run the full suite of detection algorithms locally. The standalone architecture is suitable for mobile operations and facilities that do not prefer cloud connections to their infrastructure. In such an implementation, each detector node must have all of the required hardware and software.

The cloud implementation is based on a local network of edge nodes that possess basic RF cellular survey capabilities and the ability to communicate to the Internet. Specifically, the cloud architecture includes lower-cost edge nodes that do not have the required hardware and software to make RBSR determinations in isolation. The cloud architecture can offload tasks performed at nodes in the standalone case (namely RF scan decode and RBSR detection and identification) to a central node. In the cloud architecture, RF survey data is passed from edge nodes to a local server that can perform filtering before forwarding the necessary data to a cloud instance where all RBSR detection and identification algorithms reside. In the cloud architecture, the statistical RBSR detection and identification algorithms can utilize data collected from geographically diverse locations to perform deeper analytics.

Figure 4:
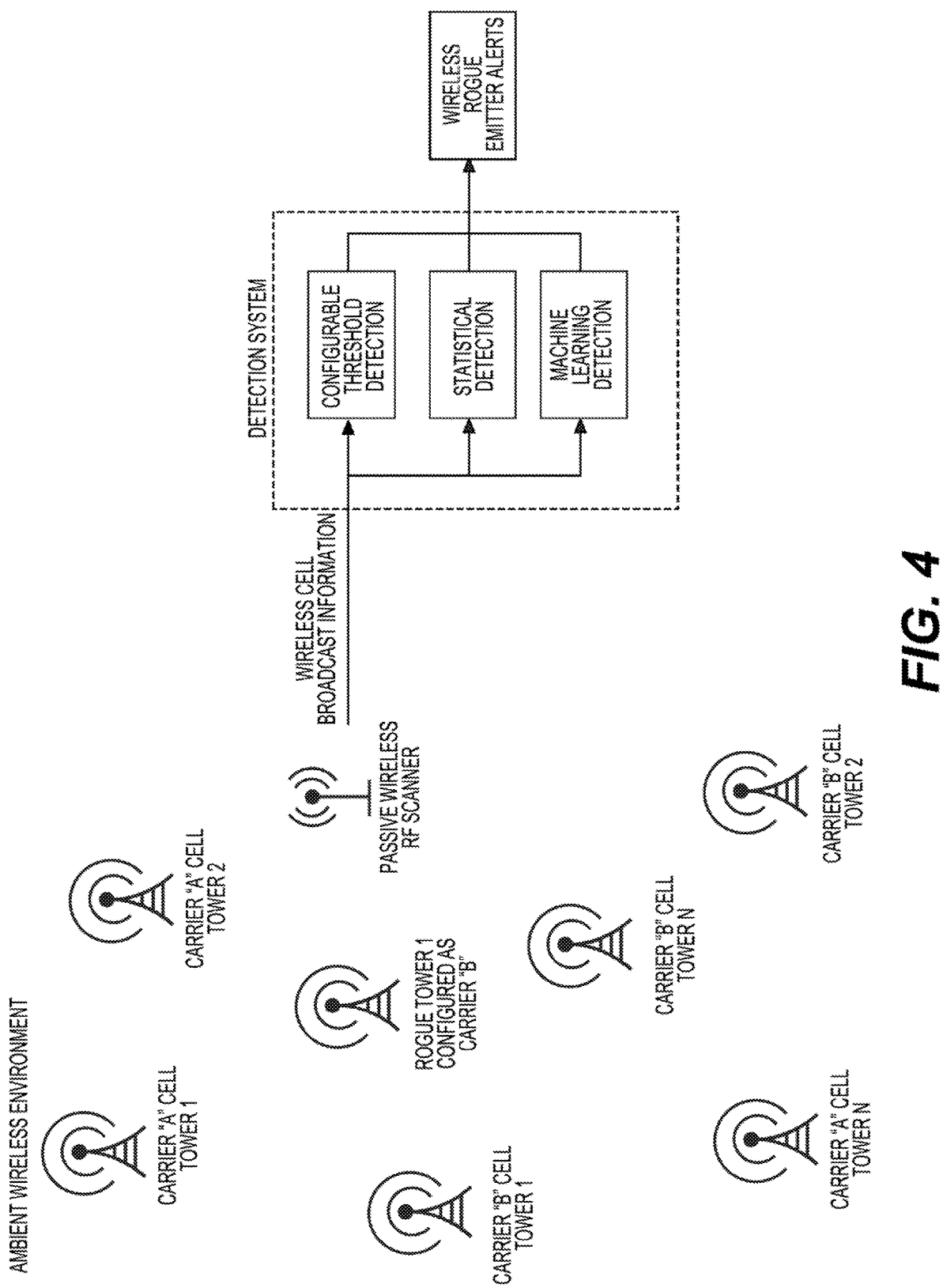
FIG. 4 illustrates a use case for an RBSR according to an aspect of the application.

FIG. 4 illustrates a use case embodiment for detecting an RBSR in an ambient wireless environment. In this exemplary embodiment, a configurable threshold detection algorithm is utilized by the processor of an apparatus to execute instructions. In another embodiment, the configurable threshold detection algorithm may be used in conjunction with a statistical detection algorithm or machine-learning algorithm in determining a confidence level of a suspected base station/cellular tower as being an RBSR. In yet another embodiment, the configurable threshold, statistical and machine learning algorithms may be used together in determining a confidence level of a suspected base station/cellular lower as being an RBSR.

As shown in FIG. 4, the detection system is a passive wireless RF scanner (i.e., transceiver) capable of detecting signals in the ambient wireless environment. In this embodiment, a rogue "Rogue Tower 1" has been intentionally introduced, for discussion purposes, into a commercial cellular broadcast environment and has been configured to electionically impersonate Carrier B's Cell Tower 1. This impersonation is observed by analyzing the information that Carrier B's Cell Tower 1 wirelessly broadcasts and comparing it with the information that the rogue cell tower (i.e., Rogue Tower 1) wirelessly broadcasts. Both may have similar information, such as a commercial carrier's unique PLMN code, which is used to distinguish carriers (e.g., AT&T from Verizon).

FIG. 5 illustrates a GUI on a display. The GUI presents a detection log of all delected cellular towers (i.e., BSRs) in an ambient environment. The detection log includes dropdowns for Anomalous Cells (which activates the GUI shown in FIG. 6), Settings, and Developer Settings. The columns of the detection log include a column indicating a confidence level that is based upon one or more predetermined criteria and one or more included algorithmic approaches. The detection log further includes columns indicating a cellular tower's Global Cell Identifier (GCI), RAT, associated triggers, channel/code, signal strength, and the last lime the cellular tower was seen on the network. Specifically, the confidence level is a percentage ranging from 0-100%. For example, the cellular tower in the second row indicates a confidence level of 30% that this cellular tower may be an RBSR and is based upon the algorithm's findings. For this cellular tower, the RAT is GSM, and it was last seen 12 minutes ago. Meanwhile, the cellular tower provided in the third row is operating in a GSM network with procedural and statistical triggers being employed. The third-row cellular tower's channel code is 616/62 and has a signal strength of −93 dBm. The third-row cellular lower was last seen 20 minutes ago. Based on the predetermined criteria employed in the procedural and statistical algorithms, the confidence level for determining that the third-row cellular tower is an RBSR is 100%. Meanwhile, the cellular tower in row 16 indicates a confidence level of 100% that this cellular tower is an RBSR. The sixteenth-row cellular tower is indicative of Rogue Cellular lower 1 introduced into the system as shown in FIG. 4.

It is envisaged that the detection architecture continuously scans and runs updates in the ambient environment in real-time, which, in turn, allows the confidence level to be updated in real-time. By so doing, the system continuously checks for rogue devices (i.e., cellular tower or dynamic BSR) to avoid false positives or negatives.

FIG. 5 also shows a notification in the GUI indicating that an RBSR is delected. The notification may be configured such that it appears at the first instance of a new RBSR exceeding a predetermined confidence level. Alternatively, the notification may appear periodically tor every RBSR that continues to exceed a predetermined confidence level.

FIG. 6 illustrates a GUI of the detection system on a display. The GUI may be activated by selection of the Anomalous Cells dropdown item shown in FIG. 5 and presents a log generated by the RBSR detection and identification application. The log details which cellular towers (i.e., BSRs) were flagged as being potential RBSRs (i.e., anomalous BSRs). Notably, the generated log shows the level of confidence and the triggered algorithms, which indicate the degree to which the potential rogue is believed to be an RBSR. The GCI can be used to track the cell tower in a repeated iterative cellular survey to get more cell information as needed. The application also displays a recording of the time that the suspected rogue was initially and last seen. In so doing, events can be reconstructed over time, exported to other analysis tools, and archived.

FIG. 7 illustrates a GUI of the detection system on a display. The GUI presents a cellular survey of the cellular towers (i.e., BSRs) in the network. Here, the dashboard gives the date and time of the cellular survey. The GUI depicts a scan that is currently running. Specifically, the cellular survey has been running for 4 minutes and 11 seconds before a present time. The cellular survey began at 5:42:53 PM and the last measurement was several seconds prior to the present time. The last iteration time was 2 minutes and 53 seconds prior to the present time. The iteration count is 1.

The GUI in FIG. 7 also depicts the progression of decoding the SIBs in the network. The task bar indicates that 68.98% of the decoding is complete. The GUI also provides a count of cell towers by RAT. For LTE, there are 8 cell towers and 29 measurements. For Universal Mobile Telecommunications System (UMTS), there are 6 cell towers and 16 measurements. For GSM, there are 5 cell towers and 13 measurements. In total, there are 19 cell towers and 58 measurements.

FIG. 8 illustrates a GUI of the detection system on a display. The GUI presents decoded cellular broadcast information for a cellular tower, such as for example, one of the cellular towers indicated in FIGS. 4-6. In this instance, the cell information indicates that the carrier is AT&T with a PLMN of 310410. The RAT is UMTS and the band is band 2-1900-PCS A-F. This broadcast information can be obtained, for example, with free software applications and low-cost hardware, public databases, and COTS or custom application-specific devices.

The GUI shown in FIG. 8 also indicates a BA-List, Intra-Frequency Cells, Inter Rat Cells, and SIBs. Under the dropdown for SIBs, SIBs 1, 2, 3, 5, 7, and 11 and the MIB are displayed. SIB 1 is for Non-Access Stratum (NAS) information; SIB 2 is for available Universal Terrestrial Radio Access Network (UTRAN) Registration Areas (URAs); SIB 3 is for cell selection/reselection parameters used by UE in idle mode; SIB 5 is for common physical channels information for UE in idle mode; SIB 7 is for fast changing cell parameter information; SIB 11 is for measurement control information for UE in idle mode; and MIB is for the master information block.

Figure 9:
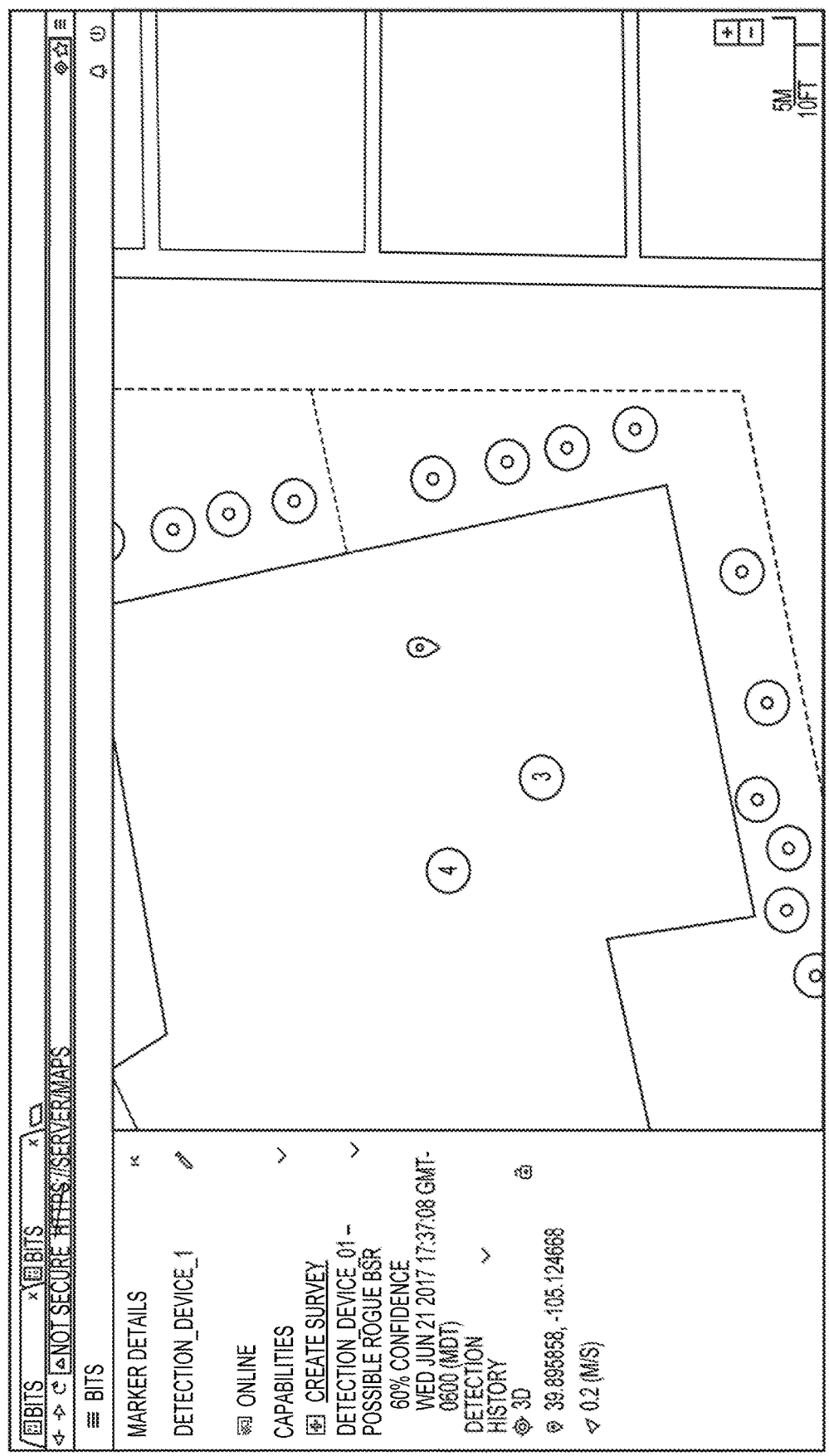
FIG. 9 illustrates a GUI of a mapped, potential RBSR on a display according to an aspect of the application.

If the detection system has GPS capability, location data can also be logged and mapped. FIG. 9 illustrates an exemplary embodiment where a GUI on a display illustrates an RBSR in an environment. The left side task bar of the GUI provides capabilities including, but not limited to, marker details of the detection device, an online function, create survey and confidence levels.

FIG. 10 illustrates a GUI on a display for trigger parameters of the configurable/procedural algorithm. The trigger parameters help the detection system determine which BSRs meet the criteria for an RBSR. The threshold settings can be manually configured by a user. Alternatively, they can be automatically configured by other algorithms that analyze the average settings for a given cellular network. FIG. 10 also includes a notes section where specific comments of a particular BSR can be included. FIG. 10 also includes a signal strength indication of the BSR. Further, the left side task bar of the GUI in FIG. 10 provides for a check of anomalous cells, settings and developer settings.

Figure 11:
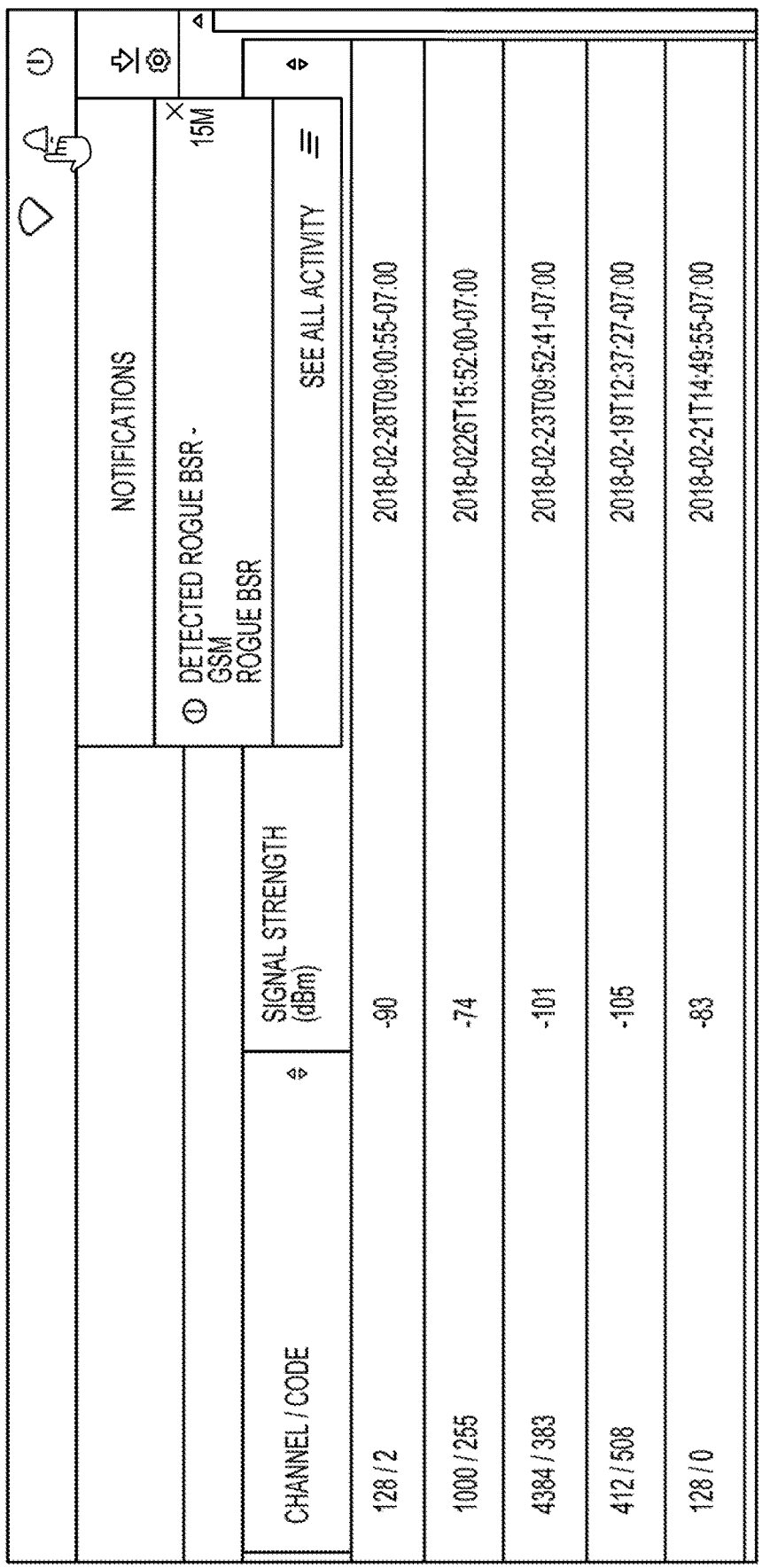
FIG. 11 illustrates a GUI of a notification of an RBSR on a display according to an aspect of the application.

According to another aspect, FIG. 11 depicts a GUI on a display notifying users of a particular device/BSR exhibiting characteristics of an RBSR. A software algorithm with configurable parameterized thresholds can analyze a set of collected broadcast parameters and trigger alerts or other actions when one or more configurable thresholds is outside commercial bounds, or when known commercial parameters are not present at all in the collection relative to like-carrier peers. The knowledge of which collected parameter values are out of bounds can be the result of a priori knowledge or other algorithms. When one or more out of bound or absent parameters occurs within a complete collection of a given lower's broadcast information that has some similar parameters to a commercial carrier, it can be reasonably determined that it is potentially electronically impersonating a commercial carrier's tower on its cellular network.

Detecting a Precursor to a Cellular Network Attack

According to another aspect of the patent application, an attack on a cellular communication system is typically preceded by detecting one or more RBSRs in the system. As discussed above, the RBSRs can be configured with inexpensive hardware and open source software and can be configured to electronically impersonate authentic BSRs in the cellular network. The RBSRs also can be concealed, such as in a backpack with a battery, and introduced into a system. The methods for detecting an RBSR are described above in significant detail.

The target cellular systems can span a wide variety of device types such as personal and business handsets and M2M communication links as illustrated in FIG. 1. The cellular attack types can range from a basic DoS to more malicious attacks such as MITM snooping and impersonating, unwarranted location tracking, and malware injection into connected clients. These attacks affect public safety, critical infrastructure stability, and revenue for businesses.

According to an embodiment, when an RBSR detection and identification system detects an electronically impersonated commercial cellular tower, and the detection is correlated with external events (e.g., cellular handsets or systems that cannot get service), the detection system can run advanced analytics to evaluate whether a cellular attack is underway. The advanced analytics may be helpful in discerning true threats from network issued, such as for example, a network operator experiencing technical difficulties. According to another embodiment, a large occurrence of unplanned software update requests to commercial cellular handsets can be indicative of cellular attack in the presence of a detected rogue tower or RBSR. When the detection system determines the cellular attack is underway, appropriate alerts and notifications may be sent to users in the system in accordance with the measures discussed earlier.

In an exemplary embodiment, an architecture is described as including a non-transitory computer readable media having instructions for determining if a cellular attack on a communication system is occurring or imminent. The instructions can be executed by a processor to determine whether a router or cellular tower in the communication system is rogue. The determination of whether a router or cellular tower is rogue is based on the router or cellular tower (and associated attributes, parameters, measurements, etc.) being out of range of predetermined criteria. Another executed instruction includes determining an external event exhibiting a characteristic of a cellular attack is occurring in the communication system. Yet another executed instruction includes computing a confidence level of a cellular attack in view of the determined rogue router or cellular tower and the external event. Yet another executed instruction includes sending a notification to all users in the communication system that a cellular attack is currently taking place.

Cellular Network Testing

According to even another aspect of the patent application, the detection system can be used to ensure a cellular BSR does not broadcast outside predetermined thresholds. This technique may be employed during development and testing of a new BSR system where software loads are continuously iterated. The detection system serves as an automated notification platform that alerts developers when the BSR is broadcasting erroneous or unplanned broadcast information.

In one embodiment, an architecture is described that includes a non-transitory computer readable media storing instructions that when executed by a processor perform aspects for determining whether a BSR is not operating in a cellular communication system as an RBSR (i.e., a BSR is broadcasting within an acceptable range). One of the executable instructions includes configuring predetermined criteria used to evaluate if the BSR is operating within an acceptable range. Another executable instruction includes evaluating information of the BSR in view of the acceptable range.

Another executable instruction includes determining if the BSR is operating out of range using an algorithm providing weights for the predetermined criteria falling outside of the acceptable range. Yet another executable instruction includes notifying an administrator of the BSR operating of range. Yet a further executable instruction includes updating software of the BSR to fall within acceptable range of the predetermined criteria. The above-mentioned steps are reiterated as necessary to ensure the BSR is acceptable for use in the communication system.

Detecting Illegal Cellular Broadcast Activity

According to yet a further aspect of the application, a detected outlier tower based upon predetermined criteria may not always be a precursor of a cellular attack. That is, if the confidence level has been met, the BSR may be an inadvertent yet illegal configuration by a legitimate commercial carrier. Alternatively, the BSR or cellular tower could be the result of a researcher who accidentally configured a BSR to broadcast as a commercial carrier. Since the activity may violate certain laws and potentially disrupt public communication and safety, a notification may be sent to the appropriate authorities by the system.

Rogue Detection and Identification with Procedural Algorithm

According to a further aspect of the application, the configurable/procedural method detects potential RBSRs utilizing prior knowledge of a cellular environment, such as valid carriers, RATs, and specific known base station properties per manufacturer, and comparing specific values of the collected broadcast data to pre-configured thresholds tuned for the cellular environment and known base station types. This broadcast data details specific values associated with each BSR within the scanned area. When a broadcast value from a BSR breaks a threshold, the weight for that broken threshold is then added to the confidence value. The procedural method requires only a non-zero amount of base stations to be effective and therefore provides augmentation to more sophisticated methods that may require larger base station sample sizes.

Figure 12:
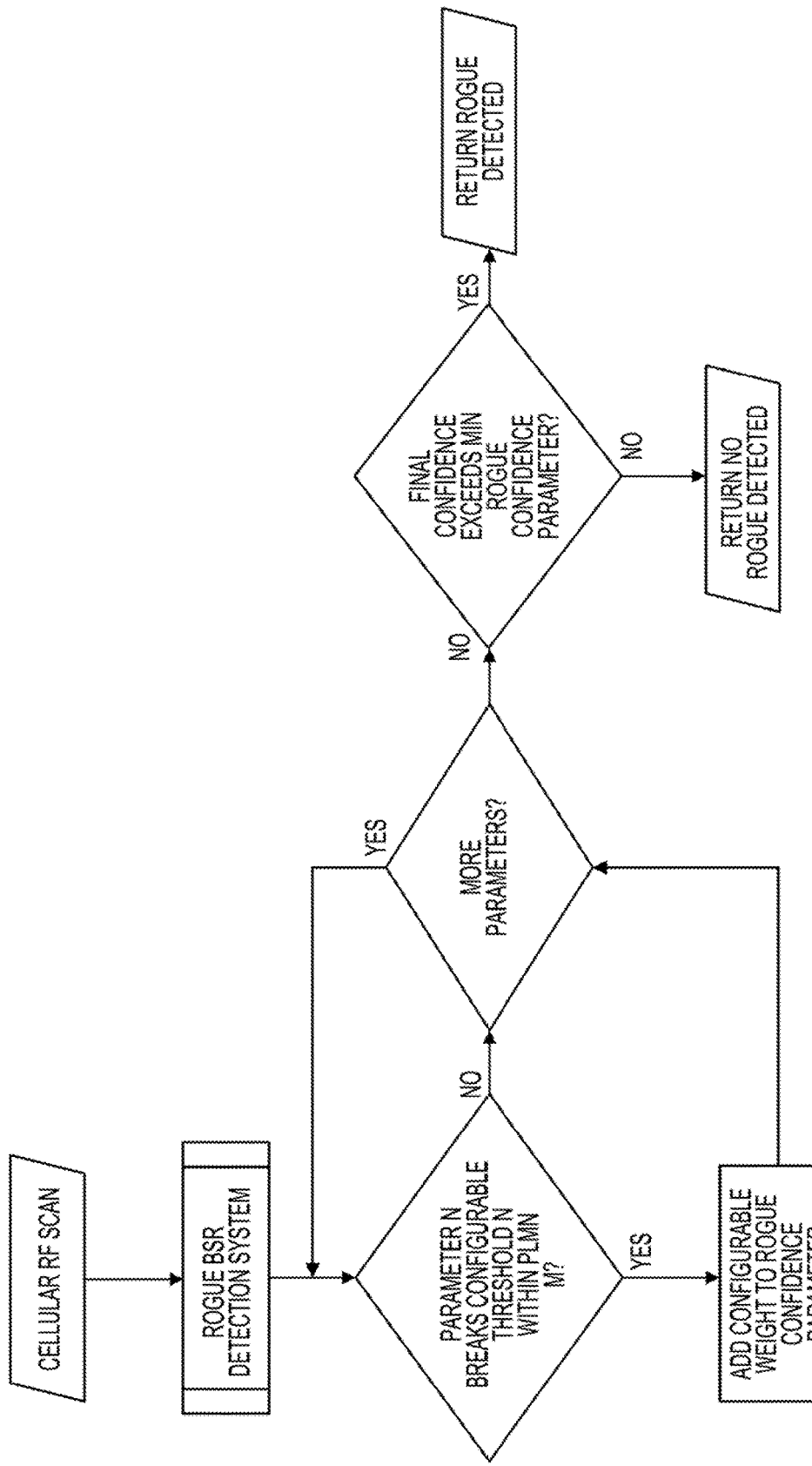
FIG. 12 illustrates a procedural RBSR detection flowchart according to an aspect of the application.

FIG. 12 illustrates an exemplary flowchart of the procedural algorithm according to an embodiment. First, the detection system performs a cellular scan of the environment. Next, the detection system decodes the broadcast information and evaluates the SIBs of the cells. If any cell parameter 'n' exceeds a configurable threshold, a weighted value for 'n' is added to a rogue confidence parameter. The detection system repeats the inquiry for additional cell parameters 'n+m' and adds the weighted values to the rogue confidence parameter. Next, a determination is made whether the final rogue confidence of all weighted values exceeds a predetermined threshold. If so, an RBSR is detected.

In yet another aspect of the application, the RBSR detection and identification application can automatically run at the end of a cellular survey. It can also be place in continuous survey mode. The results may be displayed and updated in real-time.

The RBSR application algorithm has its own set of controls, thresholds, and weights that can be configured for each possible rogue event. A voting weight is associated with each threshold, and this voting weight assignment scheme allows users to squelch outputs and algorithms as necessary. The procedural algorithm looks to the thresholds specified by the configured system settings to determine what to compare a scanned broadcast value for a BSR deemed potentially rogue. The procedural algorithm then derives the voting weight associated with the exceeded threshold by consulting the system settings. This voting weight is used to calculate the associated minimum confidence percentage. These voting weights, thresholds, and other controls can be part of the exportable RBSR detection and identification system settings configuration. Exportable RBSR detection and identification settings configuration files can be imported and exported to ensure that multiple systems are operating with the same settings.

A final minimum confidence percentage is calculated for each potential RBSR. The minimum confidence percentage is the sum of all event weights for exceeded parameters or thresholds from all active algorithms. The final minimum confidence percentage threshold may be configurable by the user to control the threshold at which rogue events are logged and notifications are sent.

Next, the SIBs are decoded and compared with predetermined criteria tor discovering Ihe RBSR. In one exemplary embodiment each of the predetermined criteria has a threshold. Once Ihe threshold has been met, a value for the predetermined criteria is factored in to determine the likelihood of an RBSR. The criteria may include, though is not limited to, known variables for valid public land mobile number codes, RATs for a given region, and bands for a given region.

Figure 13:
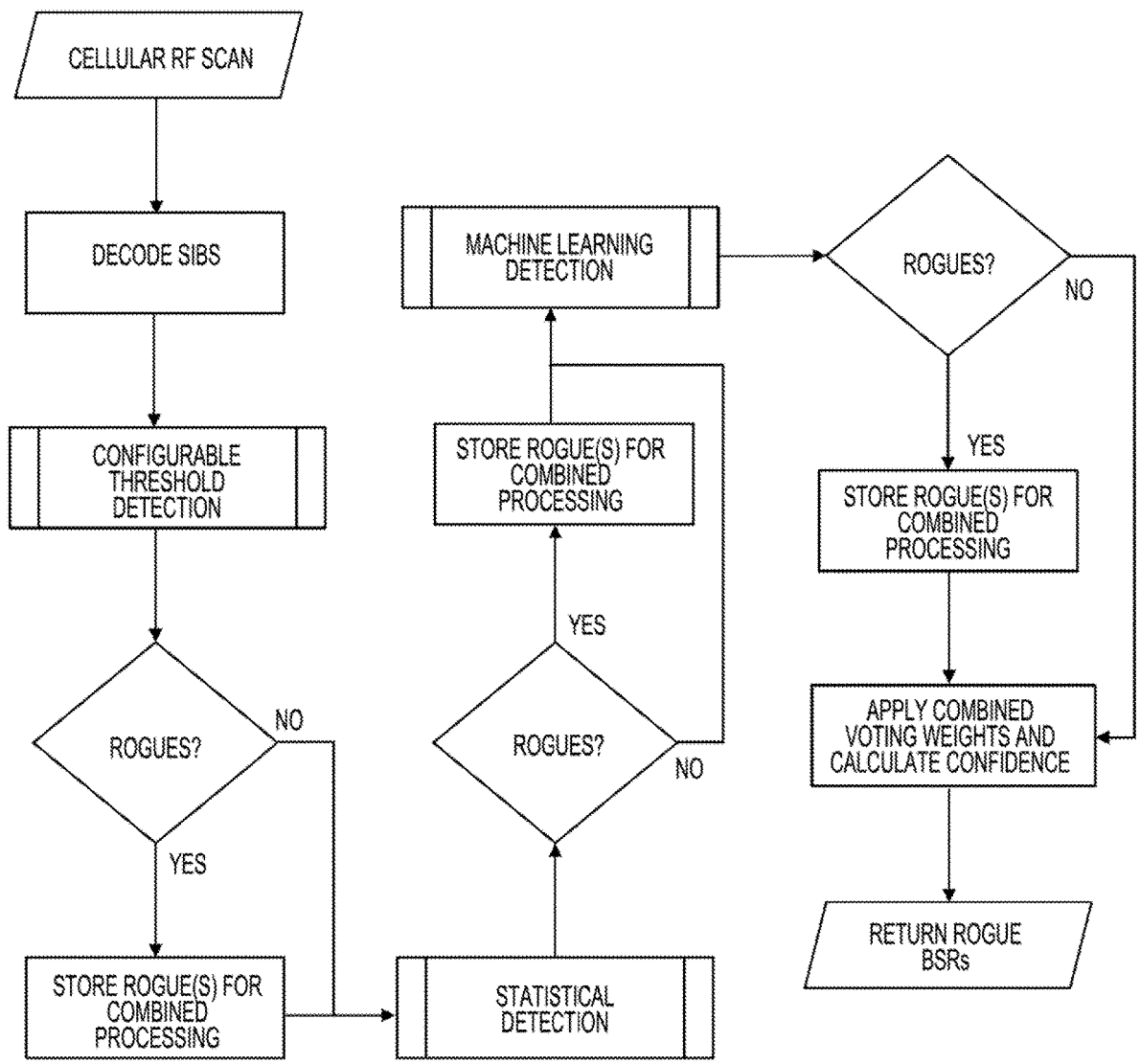
FIG. 13 illustrates another RBSR detection flowchart according to an aspect of the application.

FIG. 13 illustrates an all-encompassing RBSR detection system, which includes a weighted sum and ultimate result of the confidence threshold query for the procedural algorithm shown in FIG. 12 along with a confidence threshold query for statistical and machine learning algorithms. The order of the three algonthms is arbitrary. The purpose of the combined voting weights from the three algorithms is to provide a more accurate confidence level for determining a BSR/cellular tower is rogue. Employing one or more of the algorithms, either individually or collectively, is useful when one of the algorithms cannot effectively execute without broadcast information from at least two BSR's. For example, statistical and lnachine learning algorithms typically need broadcast information from at least two or more BSRs to make determinations of what is a normal configuration versus and outlier configuration. In such instances, the procedural algorithm is useful.

While the system and method have been described in terms of what are presently considered specific embodiments, the disclosure need not be limited to the disclosed embodiments. It is intended to cover various modifications and similar arrangements included within the spirit and scope of the claims, the scope of which should be accorded the broadest interpretation to encompass all such modifications and similar structures. The present disclosure includes any and all embodiments of the following claims.

What is claimed is:

1. A method for detecting a rogue device in a network comprising:
    providing an algorithm including predetermined criteria, executed by a processor, for detecting the rogue device;
    performing repeating cellular scans across the network, wherein a cellular scan comprises:
        receiving, from the cellular scan, survey data including system information blocks (SIBs) of plural devices on the network,
        decoding the SIBs of the devices,
        comparing the decoded SIBs with the predetermined criteria,
        determining a threshold of the predetermined criteria has been met by the decoded SIBs associated with one of the plural devices, and determining a first occurrence and a last occurrence of the one device in the network over the repeating cellular scans;

calculating a confidence level based upon one or more met thresholds of the one device during two or more of the repeating cellular scans and the first and last occurrences of the one device over the repeating cellular scans; and determining, based on the calculated confidence level, the one device exhibits characteristics of the rogue device.

2. The method of claim 1, wherein the confidence level is based upon a weighted sum of thresholds of plural predetermined criteria being met.

3. The method of claim 1, wherein the confidence level is based upon an event occurring in the network.

4. The method of claim 3, wherein the event is selected from a software update, network connectivity issues, and combinations thereof.

5. The method of claim 3, wherein the confidence level is continuously updated in view of further repeating the cellular scan.

6. The method of claim 3, further comprising:
notifying users on the network of the rogue device when the confidence level exceeds a predetermined value.

7. The method of claim 6, wherein the notification is sent via text, email, browser or combinations thereof.

8. The method of claim 1, wherein the determined rogue device is a cellular tower or dynamic base station router.

9. The method of claim 1, further comprising:
displaying, on a graphical user interface (GUI), a list of the plural devices in the network each with a confidence level; and
determining, based upon the confidence level, which of the plural devices exhibits characteristics of the rogue device.

10. The method of claim 1, further comprising:
displaying, on a GUI, respective times of the first and last occurrences of the one device in the network;
determining that the first and last occurrences fall within a predetermined value; and
notifying users of the rogue device.

11. A system for testing a cellular network comprising:
a non-transitory computer readable media storing instructions for determining if a cellular attack from a rogue base station router (RBSR) on a cellular network is active, which, when executed by a processor, perform aspects of:
surveying the cellular network to obtain broadcast data;
determining a base station router (BSR) in the cellular network is the RBSR based upon a threshold of a predetermined criteria being met in the broadcast data;
determining that an event associated with a cellular attack is present in the cellular network; and
computing a confidence level of the active cellular attack based on the determined RBSR and the determined event.

12. The system of claim 11, wherein the confidence level is based upon a weighted sum of thresholds of plural predetermined criteria being met.

13. The system of claim 11, wherein the event is selected from a software update, network connectivity issues, and combinations thereof and wherein the cellular attack is selected from a denial-of-service (DoS) attack, a distributed DoS (DDoS) attack, a man-in-the-middle (MITM) attack, and combinations thereof.

14. The system of claim 12, wherein the confidence level is continuously updated in view of a repeated cellular scan.

15. The system of claim 11, further comprising:
notifying users in a communication system associated with the active cellular attack based on the confidence level exceeding a predetermined level.

16. A system comprising:
a non-transitory computer readable media storing instructions for configuring a base station router (BSR) in a cellular network, which when executed by a processor, performs aspects of:
configuring an algorithm including predetermined criteria representative of a rogue base station router (RBSR);
causing the BSR to transmit information;
evaluating the information transmitted by the BSR in view of the predetermined criteria;
determining that the BSR has met a threshold of the predetermined criteria representative of the RBSR; and
generating a notification indicating that the BSR has met the threshold of the predetermined criteria representative of a RBSR and requesting that the BSR be configured to not meet the threshold of the predetermined criteria representative of a RBSR.

17. The system of claim 16, wherein the aspects further include calibrating the information transmitted by the BSR based upon the determining that the BSR has met a threshold of the predetermined criteria representative of the RBSR.

18. The system of claim 16, wherein the determination is based upon a weighted sum of thresholds of plural predetermined criteria being met.

19. The system of claim 16, further comprising:
notifying users on the network of the BSR when the threshold exceeds a predetermined value.

20. The system of claim 16, wherein the aspects further include:
causing the BSR to transmit second information;
evaluating the second information transmitted by the BSR in view of the predetermined criteria;
determining that the BSR has not met the threshold of the predetermined criteria representative of the RBSR; and
generating a notification indicating that the BSR has not met the threshold of the predetermined criteria representative of a RBSR.

* * * * *